Aug. 2, 1966   J. J. SENNELLO ET AL   3,264,523
SYNCHRO CONTROLLED SAFETY DEVICE FOR POSITIVE DRIVE
ROTARY SHAFT POWER TRANSMISSIONS
Filed Sept. 24, 1962                               3 Sheets-Sheet 1

JOSEPH J. SENNELLO
AND ERNEST M. GORE
INVENTORS
BY Walter H Beland
AGENT

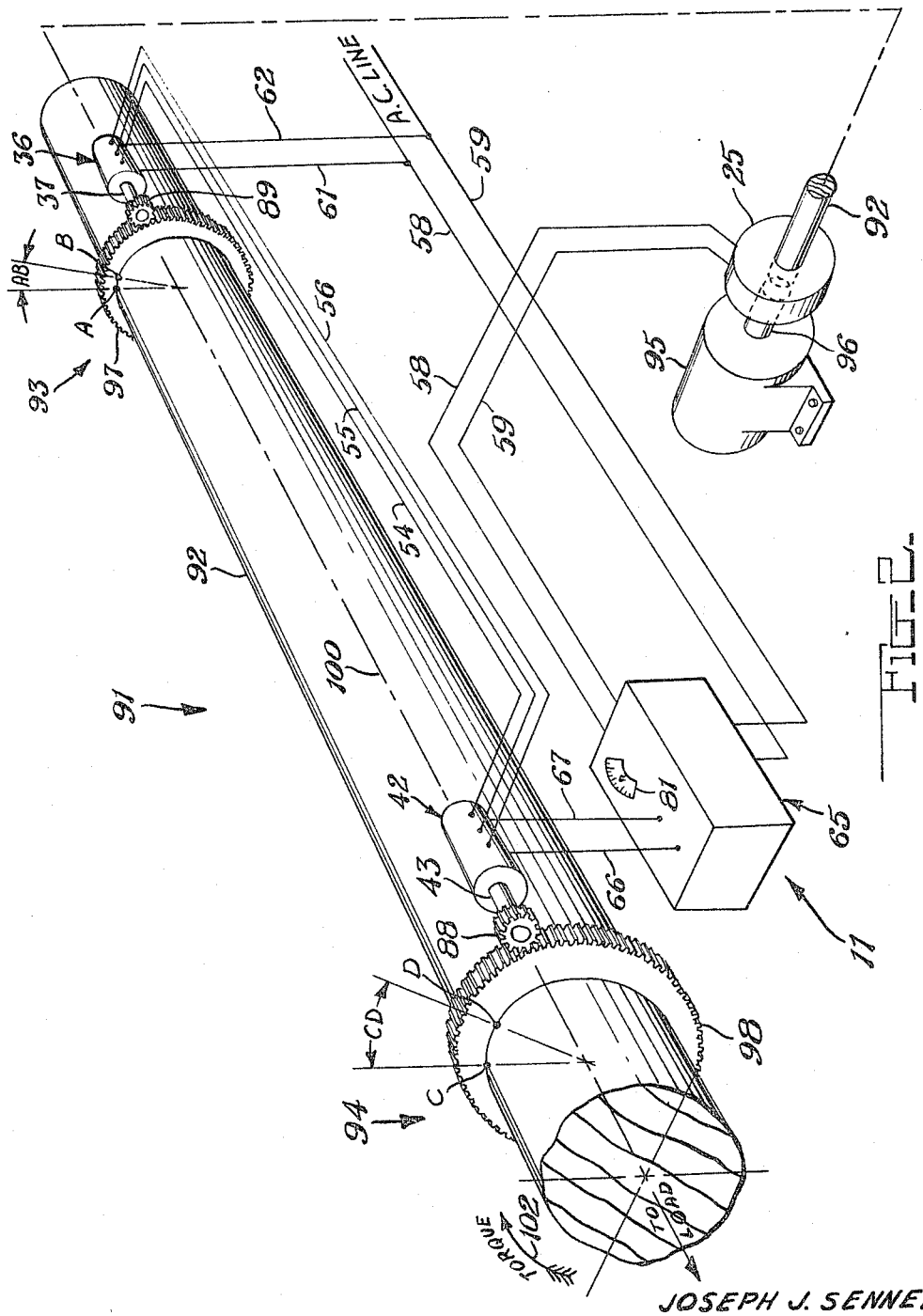

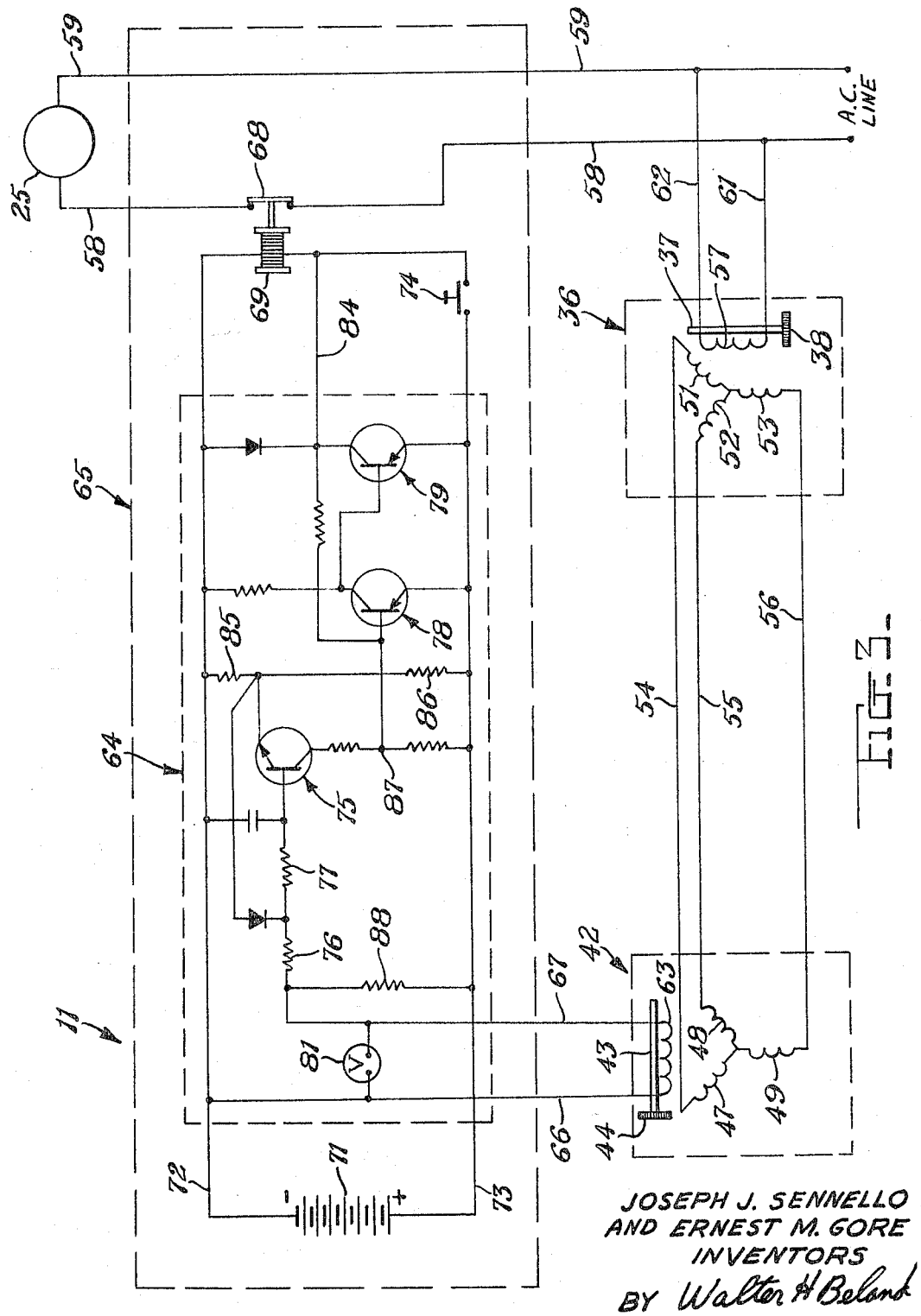

United States Patent Office 3,264,523
Patented August 2, 1966

3,264,523
SYNCHRO CONTROLLED SAFETY DEVICE FOR POSITIVE DRIVE ROTARY SHAFT POWER TRANSMISSIONS
Joseph J. Sennello, Oaklawn, and Ernest M. Gore, Chicago, Ill., assignors to Continental Can Company, Inc., New York, N.Y., a corporation of New York
Filed Sept. 24, 1962, Ser. No. 225,685
7 Claims. (Cl. 317—6)

The invention relates to power transmission systems of the rotary shaft type. In power transmissions of this type it is often necessary to maintain certain of the shafts in the system in a fixed angular rotational position relative to each other. Such synchronization of the movement of the various shafts of the system is usually accomplished by using positive drive means to drive the shafts, such as gears and chains, as opposed to drive belts which might slip causing the system to get out of synchronization.

Even when using such positive drive means as gears for driving the various shafts in a power transmission system there is always a possibility that important shafts in the system may get out of synchronism, due to movement of a gear relative to the shaft it is mounted on, due to wear of the gear teeth or due to a permanent twist being imparted to one of the shafts in the system caused by overloading the system. In modern high speed machinery it is often necessary that widely spaced apart stations of the machine must operate in substantially exact sychronism in order for the machine to perform its functions properly and also to prevent damage to the machine which would occur if the stations were operating out of synchronization.

It is the main object of the invention to provide a device that will detect the rotational angular relationship between two spaced apart stations of a rotating shaft type power transmission system and which is operable over the entire speed range of the power transmission system and even when the system is at rest.

It is a more specific object of the invention to provide a device that will detect the rotational angular relationship between two stations of a rotating shaft type power transmission system and which is operative to disconnect the transmission system from its drive source in the event that a deviation exists of more than an allowable amount from the desired angular relationship that should exist at the stations.

It is a further object of the invention to provide a device that will detect errors in rotational angular relationship between spaced apart stations in a rotational shaft type power transmission system and which includes a visually observable indicating means which continuously indicates the amount of angular error existing between the stations through the entire operating speed range of the system and even when the system is at rest.

It is a further object of the invention to provide a device that will continuously detect and indicate for visual observation the amount of torque being applied to a shaft in a rotating shaft type power transmission system over the entire speed range of the system and even when the shaft is not in motion.

It is an even further object of the invention to provide a device that will continuously detect the amount of twist being applied to a shaft of a rotating shaft type power transmission system and which is operable to disconnect the transmission system from its power source should the amount of twist of the shaft reach a certain predetermined limit.

Still another object of the invention is to provide devices of the types described which are reliable in operation, are highly accurate, and which are, for the most part, constructed from standard, commercially available components.

The above and other objects will best be understood by making reference to the following detailed description of the embodiments of the invention illustrated in the attached drawings in which:

FIG. 2 is a perspective view of a portion of a shaft of a rotating shaft type power transmission system which has associated therewith a detecting device in accordance with the invention which is operable to determine the amount of twist being imparted to the shaft between longitudinally spaced apart stations thereof, and;

FIG. 3 is a simplified wiring diagram which best illustrates the operating principles of the invention.

Figure 1:
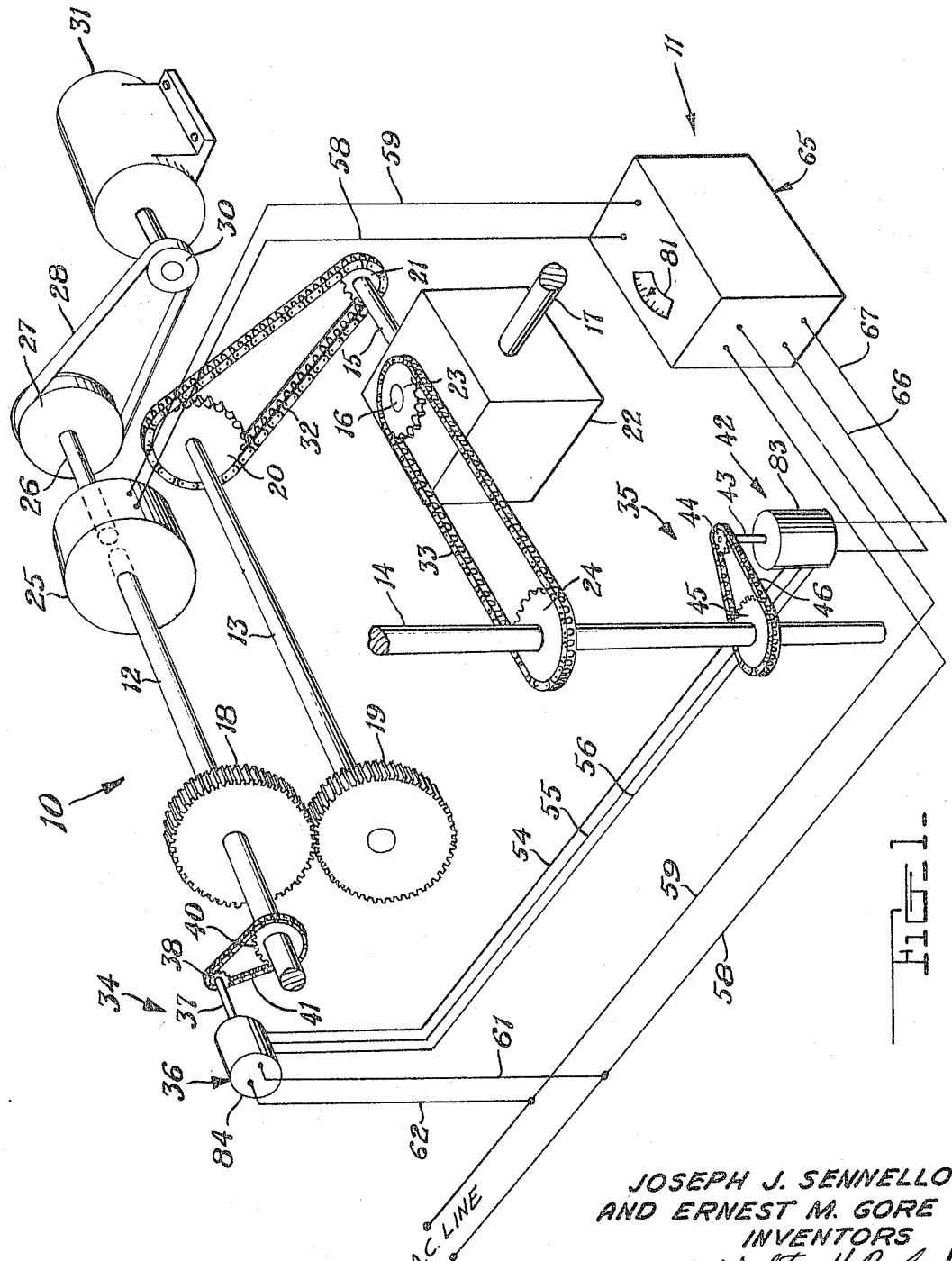
FIG. 1 is a perspective view of a portion of a rotational shaft type power transmission system having associated therewith a shaft orientation detector constructed in accordance with the invention.

Referring to FIG. 1 of the drawings, it will be seen that a portion of a rotating shaft type power transmission system is illustrated and indicated generally at 10. The system 10 includes shafts 12, 13, 14, 15, 16 and 17 which are positively driven in fixed ratio through gears 18 and 19, sprockets 20 and 21, gear box 22 and sprockets 23 and 24. The shaft 12 is driven through an electrically operated clutch 25, power supply shaft 26, pulley 27, belt 28 and pulley 30 which is attached to the output shaft of a drive motor 31.

It is to be understood that the portion of the drive system that is illustrated may be only part of the drive system of a large complex machine. Such a machine could be of the type having spaced apart work performing stations whereat metal working operations would be performed at each of the stations on a strip of metal being unwound from a roll and being fed through the stations of the machine. In machines of this type it is very important that the various work performing stations of the machine be properly synchronized so as to prevent spoilage of the work and also damage to the machine. In such a machine the shaft 12 could be used as the drive shaft for one work station while shaft 14 could be used as the drive shaft for another work station. In such a machine any shifting in the rotational position of the shaft 14 with respect to the shaft 12 would upset the synchronization between work stations thereof. Such rotational shifting of the shaft 14 with respect to the shaft 12 could be brought about by wear on the gear teeth of the gears 18 and 19 and on the teeth of the gears in the gear box 22. It could further be caused by the slipping of any of the various gears or sprockets on their shafts. Wear on the chains 32 and 33 could also contribute to angular error existing between shafts 12 and 14. Still another cause for the existance of angular error between shafts 12 and 14 could be due to overloading the power transmission system such as to cause excessive twisting of the shaft 13.

In order to detect any angular misalignment between the shaft 12 and the shaft 14 an angular position detecting station generally indicated at 34 is provided on shaft 12 and a similar detecting station generally indicated at 35 is provided on shaft 14.

Station 34 is comprised of a synchro-control transmitter generally indicated at 36 having a rotor 37 with a sprocket 38 mounted thereon. Also at station 34 is a sprocket 40 mounted on the shaft 12 for rotation therewith and a chain 41 entrained around the sprockets 38 and 40.

Station 35 is comprised of a synchro-control transformer generally indicated at 42 which includes a rotor 43 having a sprocket 44 mounted thereon. Also included at station 35 is a sprocket 45 mounted on the shaft 14 for rotation therewith and a chain 46 which is entrained around the sprockets 44 and 45.

Synchro 42 has stator windings 47, 48 and 49 (FIG. 3) which are connected to stator windings 51, 52 and 53 of synchro 36 respectively by wires 54, 55 and 56. Synchro 36 has a rotor winding 57 which is connected to A.C. power supply wires 58 and 59 by wires 61 and 62 respectively. Ordinary 115 volt 60 cycle electricity may be furnished by wires 58 and 59. The rotor 43 of synchro 42 has a winding 63 which is connected into a voltage discriminator and flip-flop network, generally indicated at 64, by means of the wires 66 and 67. The network 64 is housed in a control cabinet generally indicated at 65. Line wires 58 and 59 pass through the control cabinet 65 and into the electric clutch 25. A switch 68 is interposed in the line wire 58 within the cabinet 65. The switch 68 is operated by means of a solenoid actuator 69.

Stations 34 and 35, clutch 25, control cabinet 65 and the individual components thereof form the detecting and power disconnect system of the invention which is generally indicated at 11.

The discriminator and flip-flop network 64 is suitably energized for transistor operation by means of a battery 71 which may provide a 12 volt D.C. differential, or other suitable voltage, between the wires 72 and 73. The solenoid actuator 69 is connected directly across the wires 72 and 73 but is normally prevented from being energized thereby due to a normally open push button type reset switch being provided in the wire 73 which is indicated at 74.

The wire 66 from the winding 63 terminates in the wire 72. The wire 67 from the winding 63 terminates on the base of a transistor generally indicated at 75 via resistors 76 and 77. By this means the output voltage of the rotor coil 63 of the synchro-control transformer 42 is applied to the voltage discriminator circuit via the resistors 76 and 77. The transistors generally indicated at 78 and 79 are connected to form a flip-flop circuit or "bi-stable circuit."

A volt meter 81 is interposed between wires 66 and 67 for reading the voltage developed across the winding 63 of the rotor 43. For the purpose of the invention as related to the FIG. 1 showing the volt meter is preferably calibrated to read in angular degrees as well as volts, or in place of volts.

If the shafts 12 and 14 are to be driven at identically the same speed then the sprockets 38 and 44 and 40 and 45 can be respectively the same size. That is, sprockets 40 and 45 can be equal in size and sprockets 38 and 44 can be equal in size. This will result in the rotors 37 and 43 being rotated at identically the same speed. It is preferable that the sprockets 40 and 45 be larger than the sprockets 38 and 44 so that any shift in the angular relationship between the shafts will be multiplied when applied to the rotors 37 and 43. By thus multiplying any slight error in relative shaft position that may be detected, the accuracy of the detecting and power disconnect system 11 will be greatly increased.

Further, in accordance with the invention, it is not necessary that the shafts 12 and 14 rotate at the same speed in order to determine the angular relationship therebetween. For instance, the shaft 14 could rotate at twice the speed of the shaft 12. In such a case the ratios of the sprockets 38 and 40 and 44 and 45 would be selected so as to cause the rotors 37 and 43 to rotate at identical speeds as before.

In order to prepare the detecting and power disconnect system 11 for operation, the shafts 12 and 14 are first checked to determine if they are properly angularly oriented with respect to each other and, if not, adjustments or repairs must be made to achieve the desired relationship. The A.C. line wires 58 and 59 are then energized to supply power to the system 11. The rotor winding 57 of rotor 37 of the synchro-control transmitter 36 is now energized through wires 61 and 62. The stator windings, 47, 48 and 49 of the synchro-control transformer 42 are then rotatably adjusted with respect to the rotor 43 by turning the stator housing 83. The stator housing 83 is angularly adjusted with respect to the rotor 43 until the desired electrical couple between the rotor winding 63 and the stator windings 47, 48 and 49 has been achieved.

There will be two null positions located 180 degrees apart at which the output voltage of the stator winding 43 will be substantially zero. When either of these two positions has been achieved by rotating the housing 83, the housing is suitably clamped to prevent any further movement thereof. The stator housing 84 of the synchro-control transmitter 36 is also suitably clamped in place to prevent any movement thereof. As long as the rotors 37 and 43 do not change their relative angular rotational positions, the voltage induced in the winding 63 of the rotor 43 will continue to be substantially zero. The voltage reading on the voltmeter 81 should now be substantially zero as read in volts and should be zero on an angular degree variation scale thereof. When this substantially zero voltage condition exists across the wires 66 and 67, the flip-flop circuit transistor 79 will normally be in a conducting state and the flip-flop transistor 78 will be turned off. If the transistors 78 and 79 are actually in a reverse state from normal, the momentary operation of the pushbutton switch 74 will cause the transistors 78 and 79 to change state, making transistor 79 conduct, and shutting off transistor 78. Current from battery 71 through wire 73, transistor 79 and wire 84 results in the energizing of the solenoid 69 causing switch 68 to be in its closed position completing a circuit through wires 58 and 59 and the clutch 25. The clutch 25 is thus energized when the switch 68 is closed. When the clutch 25 is in its energized condition, the shaft 26 is caused to be rotatably coupled to the shaft 12.

If the motor 31 is now started all of the shafts illustrated in FIG. 1 will be caused to rotate, including the rotors 37 and 43. As long as the desired rotational angular relationship is maintained between shafts 12 and 14 and hence between rotors 37 and 43 the winding 63 will continue to have a substantially zero output voltage: there will be no change in the condition of the discriminator and flip-flop network 64; and, the clutch 25 will therefore continue to be energized through the closed switch 68.

Should an eventuality now occur that would upset the angular relationship between the shafts 12 and 14, such as for instance, by the breaking of the chain 33, the rotor 43 will immediately be caused to lose its proper angular position with respect to the rotor 37 and a voltage output will be induced in the winding 63 and applied across wires 66 and 67. The voltage will rapidly rise and be applied to the base of the transistor 75 via resistors 76 and 77. When this voltage has reached a predetermined amount transistor 75 will be caused to conduct. The conducting of transistor 75 immediately causes the voltage at junction 87 to become more negative which causes the flip-flop transistors 78 and 79 to change state such that transistor 79 will now be non-conducting and transistor 78 will be caused to conduct. The turning off of transistor 79 prevents current from being supplied through this transfer to the solenoid 69. The solenoid 69 is thus de-energized causing the switch 68 to assume its open position. This de-energizes the electric clutch 25 so as to uncouple the shafts 26 and 12. The transmission system 10 is thereby effectively disconnected from the drive motor 31. Transistor 79 will remain in its non-conducting state and transistor 78 will remain in its conducting state even though the voltage across wires 66 and 67 returns to zero and the power transmission system 10 will not be rendered operative again until the chain 33 has been repaired, the shaft alignment rechecked and the reset button 74 momentarily closed.

In some applications it is unnecessary to use a power disconnecting clutch such as the clutch 25. In such applications the shafts 26 and 12 may be coupled directly together and the switch 68 used to turn the motor 31 on and off. The transmission system 10 is still thus disconnected from its ultimate power source by the opening of the switch 68; the ultimate power source being the electrical energy supplied to the motor 31.

In another operational situation the shaft 13 may be caused to twist excessively due to the power transmission system 10 being overloaded. This will cause shaft 14 to change angle with respect to shaft 12 with the result that voltage will be built up across wires 66 and 67 which can be read directly on the volt meter 81. A proportional relationship will exist between the angular error and the output voltage of the winding 63 enabling the error to be directly indicated on an angular degree scale of the volt meter. This voltage will be impressed on the base of transistor 75 of the discriminator circuit. In this circuit a D.C. voltage is established on the emitter terminal of transistor 75 by means of voltage dividing resistors 85 and 86. When the output voltage of the synchro-control transformer 42, which is being applied to the base of transistor 75, exceeds the reference voltage being applied to the emitter terminal of transistor 75; transistor 75 will be caused to conduct, thus causing the voltage at junction 87 to become more negative. This change in voltage at junction 87, in turn, causes transistors 78 and 79 of the flip-flop circuit to change state causing transistor 78 to begin conducting and turning off transistor 79. The current flow through transistor 79 and wire 84 through the solenoid 69 is thus stopped. This causes the switch 68 to open, which de-energizes the clutch 25 to break the couple between shafts 12 and 26.

If the load being applied to the power transmission system 10 is greater than normal, but not excessively so, some twist will be imparted to the shaft 13 which will cause a reading on the volt meter 81. This voltage, when impressed on the base of the transistor 75, will not be sufficient to exceed the reference voltage established on the emitter terminal of transistor 75; thus the transistor 75 will remain non-conducting; in which state it will not cause the flip-flop transistors 78 and 79 to be reversed. Shaft 26 will therefore continue to transmit power to shaft 12 through the clutch 25.

The detecting and power disconnect system 11 includes two fail safe features. The first fail safe feature is resistor 88. Should the rotor winding 63 of the synchro-control transformer 42, it or its connection to the voltage discriminator circuit, be open circuited for any reason, then sufficient current will flow through resistor 88 to trigger the transistor 75 which will cause the flip-flop transistors 78 and 79 to change state resulting in the opening of the switch 68. The second fail safe feature is that during normal operation the solenoid 69 is energized. Thus a D.C. power failure will cause the switch 68 to open to disconnect shaft 12 from being driven by the shaft 26.

The system 11 of FIGURES 1 and 3 may be used to detect the amount of twist being imparted to a single shaft between longitudinally spaced apart stations thereon. This application of the system 11 is illustrated in FIGURE 2. In the FIGURE 2 showing gears 88 and 89 are mounted on rotors 43 and 37 respectively in place of sprockets 44 and 38. The portion of the power transmission system 91 which is illustrated includes a drive shaft 92 having spaced apart stations generally indicated at 93 and 94. The drive shaft 92 is driven by means of an electric motor 95 having an output shaft 96 which is coupled to the shaft 92 by means of the electric clutch 25 of the detecting and power disconnect system 11. The left end of the shaft 92 is coupled to a work load. A gear 97 is mounted on the shaft 92 at station 93 and drives the gear 89 of synchro 36. Another gear 98 is mounted on the shaft 92 at station 94 and drives the gear 88 of the synchro 42. Gears 97 and 98 are identical gears as are gears 88 and 89. Gears 88 and 89 are, however, much smaller than gears 97 and 98 so that any detected angular variation will be multiplied and the accuracy of detection thereby increased.

When the shaft 92 is at rest and no turning power is being applied thereto, reference points A and C at stations 93 and 94 respectively, will lie in a plane which contains the shaft longitudinal axis 100. If a certain predetermined torque is now applied to the shaft 92 the reference point A will be shifted over to point B and the reference point C will be shifted over to point D. An angle AB is thus created by lines through the axis 100 and points A and B. Another angle CD is created by lines passing through the axis 100 and through points C and D. As illustrated, the shaft 92 would be rotating counter-clockwise in operation and the applied torque would be in the direction of the arrow 102. Angle CD will always be greater than angle AB. Furthermore, the angular difference between angles AB and CD for various applied torques will be in proportion to the amount of torque being applied. It is thus possible to calibrate the shaft 92 by applying known torques thereto and measuring the difference between the angles AB and CD that results from each of the applied torques. Since the voltage produced across wires 66 and 67 is also proportional to the degree that the rotor 43 is rotated in either direction from a zero voltage or null position it is possible to calibrate the volt meter 81 to indicate the foot pounds of torque being applied to the shaft 92. It is most desirable, though not necessary, to have the volt meter read in foot pounds of torque, in degrees angular difference between angles AB and CD, and also in volts. A feature of the invention is that the volt meter 81 will indicate the torque being applied to the shaft 92 through the complete operating speed range of the shaft and even when the shaft is at rest. This is an important aspect of the invention in that it sometimes occurs that an overload torque is applied to a shaft when it is standing still. If, for instance, the left end of the shaft 92 became locked in position the motor 95 would transmit torque to the shaft 92 even though the motor shaft 96 could not rotate. In such an occurrence the angular difference between the angles AB and CD would become so great as to cause the rotor 43 to be rotated from its null position sufficiently to produce a high enough voltage differential between the wires 66 and 67 to trigger the transistor 75 and cause the flip-flop circuit transistors 78 and 79 to change state. This, in turn, causes the switch 68 to be opened to de-energize the clutch 25 and thus disconnect the shaft 92 from the motor shaft 96. The clutch 25 will also be de-energized in the same way when the shaft 92 is rotating at any speed, whenever the angle CD exceeds the angle AB by the same predetermined amount required while the shaft was standing still. The clutch 25 can be caused to be disengaged when greater or lesser torques are applied on the shaft 92 by changing the values of resistors 85 and 86 to thus change the reference voltage being applied on the emitter terminal of transistor 75 which must be exceeded by the voltage produced across wires 66 and 67 by the rotor winding 63. This same selection of the values of resistors 85 and 86 is also applicable with respect to the power transmission system 10 of FIG. 1.

Since; with the exception of the addition of the resistor 88 for the purpose described; the voltage discriminator and flip-flop network 64 is completely conventional; the description of the operation thereof has only been described to an extent necessary for the understanding of the invention.

The electric clutch 25 is completely conventional and of a type that is readily obtainable on the market. One manufacturer of such clutches is the Warner Electric Brake and Clutch Company of Beloit, Wisconsin. Synchros, such as synchros 36 and 42, are also conventional; readily available on the market, and may be purchased from a number of manufacturers; one manufacturer being the Bendix Corporation, Montrose Division, South Montrose, Pa.

Also, if desired, a combination electric clutch-brake unit can be substituted for the electric clutch 25 in which case a braking action is applied to the shaft 12 or 92 at the same instant that the clutch is disengaged.

It is to be further understood that the resistor 88 can be eliminated, if desired, if the safety provided thereby is not necessary for the particular operational arrangement being used. During normal operation a direct current of small magnitude will flow through resistor 88 and winding 63. The resulting D.C. voltage across wires 66 and 67 however will be barely detectable on the voltmeter 81 due to the resistance 88 being relatively very high as compared to the very low resistance of the winding 63. The effect of this D.C. voltage on the voltmeter reading is for most purposes negligible; however, if desired, the voltmeter 81 can be of a type not sensitive to D.C. voltage. If the winding 63 should become open circuited any current through resistor 88 must flow through resistors 76 and 77 into the base of transistor 75. A suitable choice of the value of resistor 88 will therefore result in a sufficient D.C. signal to cause transistor 75 to conduct which results in the switching of the state of the flip-flop transistors 78 and 79 to uncouple the clutch 25.

Since other uses and variations of the invention will become apparent to those skilled in the art upon reading the foregoing disclosure, the scope of the invention is not intended to be limited to the specific illustrated embodiments but, rather, as set forth in the following appended claims.

We claim:

1. A safety device comprising in combination: a positive drive rotating shaft type power transmission system having two spaced apart detecting stations; a power source for driving the power transmission system; a synchro-control transmitter located at one of the stations having a rotor that is coupled to a shaft portion at the station for positive proportional rotation thereby; a synchro-control transformer located at the other station having a rotor that is coupled to a shaft portion at the said other station for positive synchronized rotation thereby at exactly the same speed as the other rotor; said synchro-control transmitter having a rotor winding and means for supplying alternating electrical energy thereto; the synchro-control transmitter and the synchro-control transformer each having stator windings respectively connected together by electrical conductors; the rotor of the synchro-control transformer having a rotor winding and being normally rotatively positioned with respect to the rotative position of the rotor of the synchro-control transmitter so that a low or zero voltage output will normally exist across its rotor winding; means for selectively permitting or preventing power delivery to the transmission system from the power source; control means operatively associated with said means for selectively permitting or preventing power delivery and energized by a pre-determined voltage output of the rotor winding of the synchro-control transformer to operate the means for selectively permitting or preventing power delivery to said transmission system from the power source to prevent power delivery thereby, said predetermined voltage output resulting from an abnormal excessive rotational angular deviation arising between the shaft portions at the stations; said safety device being operable over the entire speed range of the transmission system and even when the system is stationary.

2. Claim 1 in which the shaft portions at the detecting stations are portions of the same shaft.

3. Claim 1 in which the shaft portions at the detecting stations are portions of separate shafts.

4. Claim 1 in which the means for selectively permitting or preventing power delivery to the transmission system from the power source is an electrically operated clutch.

5. Claim 1 in which the control means includes means for retaining itself in a condition in which it will retain the means for selectively permitting or preventing power delivery to the transmission system from the power source in its power delivery preventing condition upon the termination of the said predetermined voltage output of the rotor winding of the synchro-control transformer necessary to condition the control system to assume its power delivery preventing condition.

6. Claim 5 in which the control means includes reset means operable to place the control means in its power delivery permitting condition from its power delivery preventing condition at times when the voltage output of the rotor winding of the synchro-control transformer is below the level of the predetermined voltage output necessary to condition the control system to assume its power delivery preventing condition.

7. Claim 2 in which a voltmeter is connected across the synchro-control transformer rotor winding for detecting the voltage output thereof that will result from any shift in the rotational position of the shaft portion at one station relative to the rotational position of the shaft portion at the other station; the voltmeter reading being used as an indication of the torque being transmitted.

References Cited by the Examiner

UNITED STATES PATENTS

| | | | |
|---|---|---|---|
| 1,846,894 | 2/1932 | Morgan | 317—6 X |
| 2,387,901 | 10/1945 | Haverstick | 340—268 X |
| 2,461,261 | 2/1949 | Drisko | 318—466 |
| 2,482,020 | 9/1949 | Meagher et al. | 318—24 |
| 2,713,138 | 7/1955 | Lanfers et al. | 317—19 X |
| 2,772,412 | 11/1956 | Weiher | 324—158 |
| 2,839,726 | 6/1958 | Demetriou | 324—158 |
| 3,092,756 | 6/1963 | Smith | 310—95 X |
| 3,127,292 | 3/1964 | Early | 317—6 X |
| 3,131,350 | 4/1964 | Canaday et al. | 318—24 X |

FOREIGN PATENTS 152,591   7/1953   Australia.

STEPHEN W. CAPELLI, *Primary Examiner.*

FREDERICK M. STRADER, SAMUEL BERNSTEIN,
*Examiners.*

C. W. HOFFMANN, D. YUSKO, *Assistant Examiners.*